United States Patent [19]

Inoue et al.

[11] Patent Number: 4,798,969

[45] Date of Patent: Jan. 17, 1989

[54] POWER FEED SYSTEM IN TRANSMISSION LINE BETWEEN TERMINALS OF THREE-TERMINAL STATION

[75] Inventors: Yoshiyuki Inoue, Tokyo; Masaaki Takahashi, Yokosuka; Koichi Tatekura, Hiratsuka; Hitoshi Nishikawa, Tokyo; Hajime Ohta, Tokyo; Yoshikazu Kogure, Tokyo, all of Japan

[73] Assignees: Fujitsu Limited, Kawasaki; Kokusai Denshin Denwa Co., Ltd.; NEC Corporation, both of Tokyo, all of Japan

[21] Appl. No.: 151,619

[22] Filed: Feb. 2, 1988

[30] Foreign Application Priority Data

Feb. 2, 1987 [JP] Japan ................................ 62-020458

[51] Int. Cl.$^4$ .......................... H02J 3/36; H04B 3/44
[52] U.S. Cl. ...................................... 307/112; 307/45; 361/71; 361/119; 370/15; 379/2; 379/348
[58] Field of Search .................. 307/18–23, 307/34–43, 82–86, 112, 113, 115, 147, 148, 149; 340/485, 825.06, 825.16, 825.17, 825.18, 310 R, 310 A, 310 CP; 370/13.1, 15, 16, 26; 379/2, 22, 16, 17, 26, 242, 345, 348, 347, 416; 361/50, 61–82, 119, 102; 321/16, 27 R; 333/16, 18; 178/63 E

[56] References Cited

U.S. PATENT DOCUMENTS

| | | | |
|---|---|---|---|
| 3,644,787 | 2/1972 | Hamilton | 361/62 |
| 3,860,769 | 1/1975 | Pachynski | 370/15 |
| 3,868,484 | 2/1975 | Bolton et al. | 379/348 X |
| 4,419,591 | 12/1983 | Irokawa et al. | 307/45 |
| 4,451,708 | 5/1984 | Kemler et al. | 379/2 |
| 4,621,198 | 11/1986 | Roberge et al. | 307/87 X |
| 4,679,115 | 7/1987 | Connan et al. | 361/119 |
| 4,724,391 | 2/1988 | Blahous | 361/71 X |

FOREIGN PATENT DOCUMENTS 56-143735 11/1981 Japan.
57-99042 6/1982 Japan.
58-36033 3/1983 Japan.

Primary Examiner—William M. Shoop, Jr.
Assistant Examiner—Paul Ip
Attorney, Agent, or Firm—Staas & Halsey

[57] ABSTRACT

A transmission line between terminals of a three-terminal station is branched by a branching unit and power is transmitted between the terminals of the three-terminal station and a power feed system in the transmission line including: a switch for switching a power feed line feeding power to a repeater between a both-end power feed mode and a single-end power feed mode; and connection holding means for holding a power feed connection state without change upon an occurrence of a failure.

12 Claims, 11 Drawing Sheets

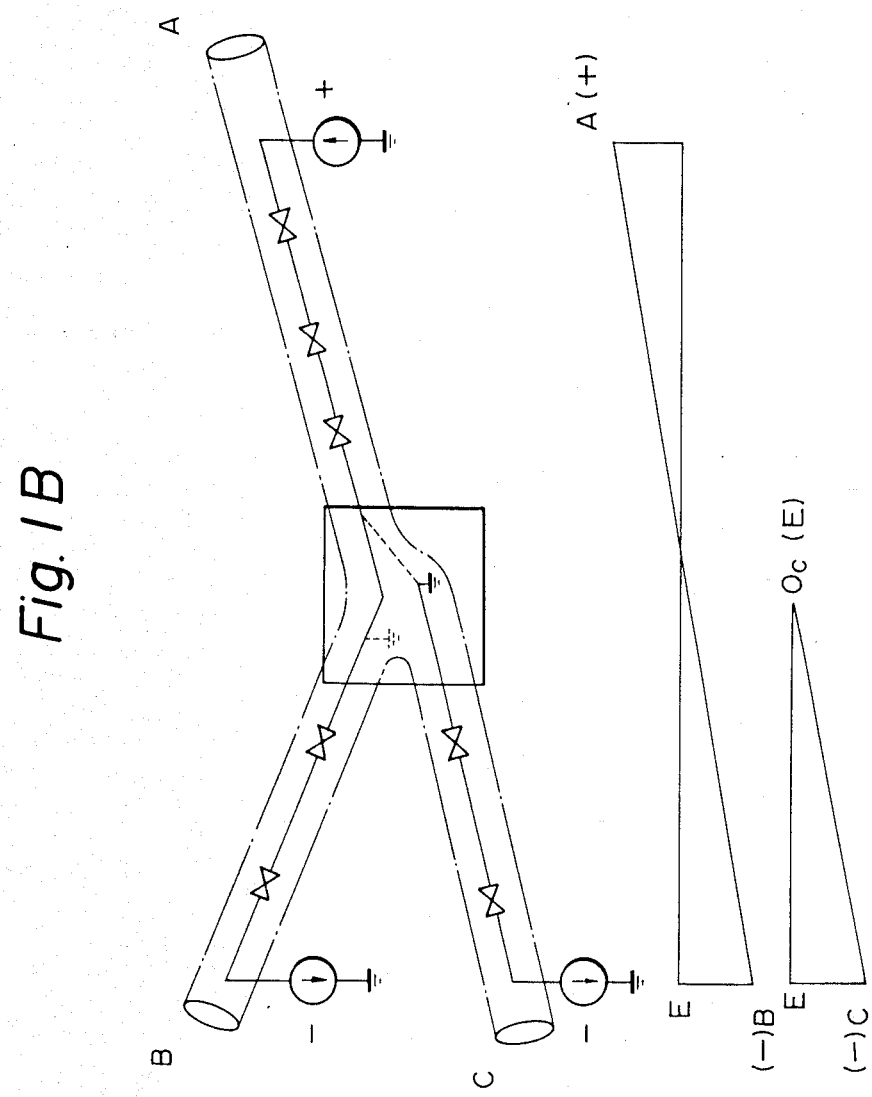

Fig. 4
PRIOR ART
(1) INITIAL STATE
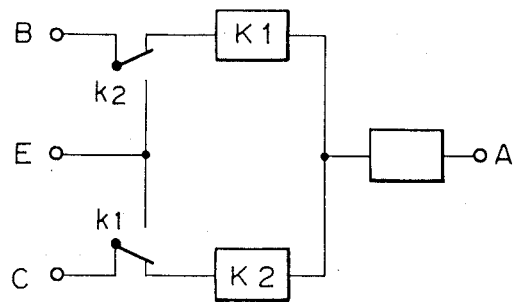
(2) NORMAL OPERATING STATE
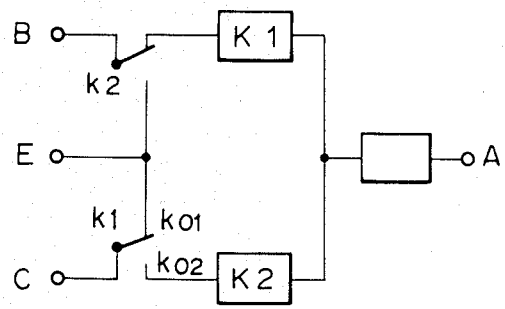
(3) FAILURE STATE
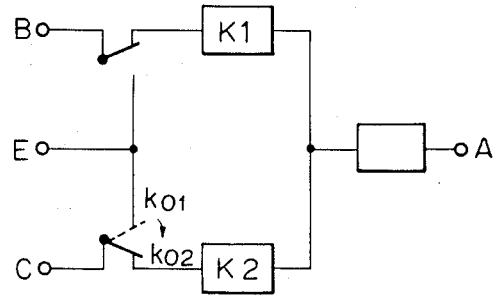

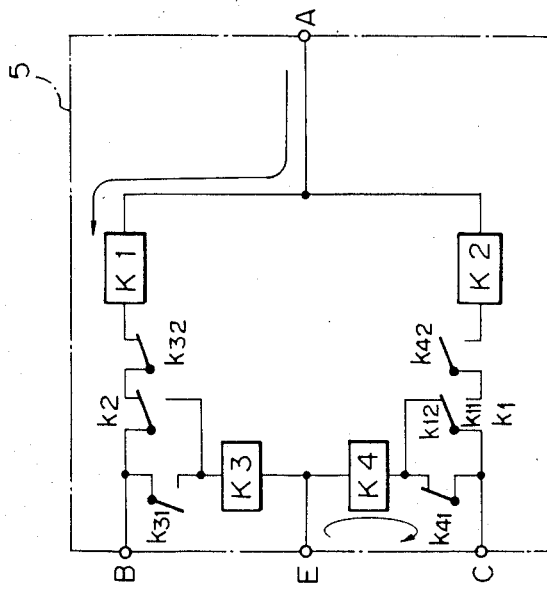
Fig. 7 NORMAL OPERATING STATE
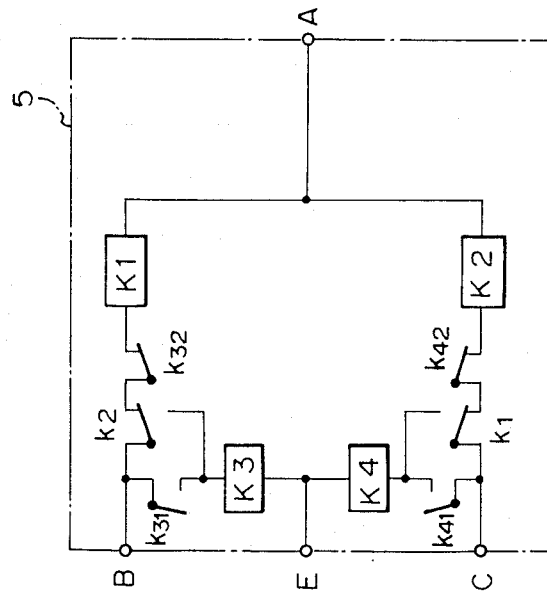
Fig. 6 INITIAL STATE

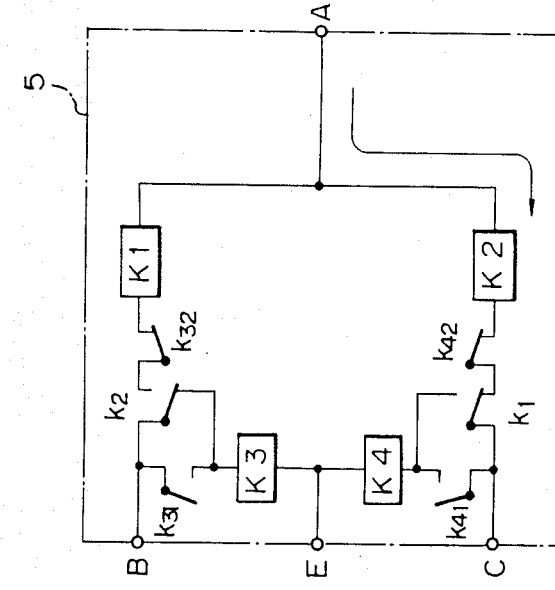
Fig. 9 NEW STATE
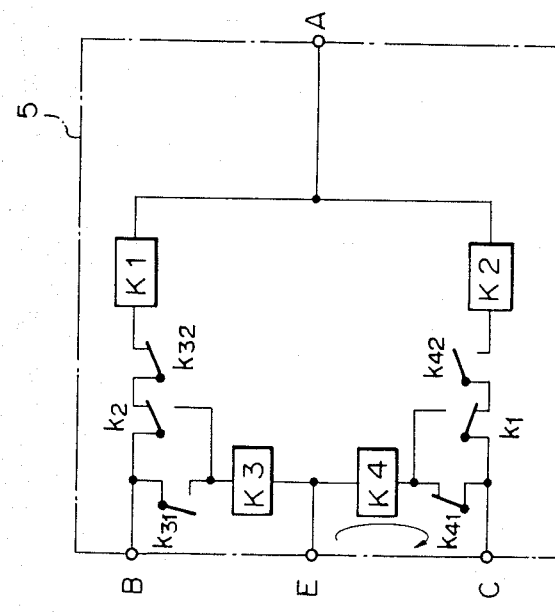
Fig. 8 FAILURE STATE

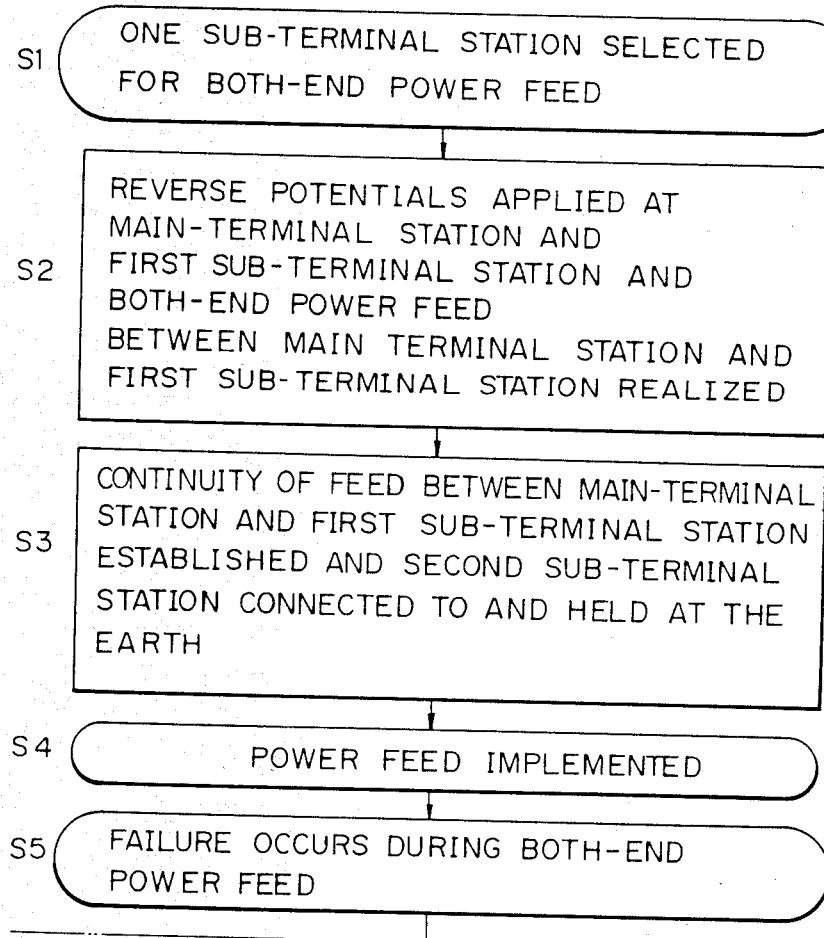

POWER FEED SYSTEM IN TRANSMISSION LINE BETWEEN TERMINALS OF THREE-TERMINAL STATION

BACKGROUND OF THE INVENTION

1. Field of the Invention

The present invention relates to a power feed system in a transmission line, and more particularly, to a system having a power feed line switching circuit by which a power feed to a repeater and a switch-over operation to a both-end power feed mode or to a single-end power feed mode are carried out in a Y-shaped transmission line between terminals of a three-terminal station.

2. Description of the Related Art

As submarine fiber-optic cable can carry multiple transmission paths, it is now possible to conceive of a device which allows physical separation of the fiber paths and the subsequent routing of these paths to different landing points. Such a device has the capability of switching power from shore such that in case of a branch failure which might be caused by surface activities such as fishing, etc., the service on the other branches can be maintained. The device also can be capable of switching incoming transoceanic signal paths between shore-end cables so that a full transoceanic capability can be maintained in the event of such a failure.

A branching repeater for the transmitting line fiber-optical undersea cable system for use in a transatlantic cable has been designed, and this branching repeater can connect a cable from one country with branches going to other countries, and can be installed off-shore from the other countries.

This branching repeater is expected to be capable of switching a high voltage power so that the transatlantic circuits can be restored in the event of a cable failure in any branch. The branching repeater is capable of a remote reconfiguration of the internal interconnection to allow for such contingencies as rerouting transatlantic traffic to one branch leg in the case of a failure in the other leg, providing a loop-back to locate faults, switching to a standby line for the transmission line, and easier testing during installation of the branching repeaters and associated links.

The branching repeater can regenerate the three cable spans which enter the device.

In this repeater, as much SL line repeater hardware (See IEEE Vol. SAC-2, No. 6, P. 929, Nov. 1984) as possible is used to minimize the design effort, as well as a plurality of power supply circuits and regenerators. The circuits having power supply circuits and regenerators are the same as those used in the repeater. Note, other supervisory circuits will be seen, but these circuits use the same hardware as the repeater.

The concept of providing power to an undersea cable system is that of supplying an accurately-controlled direct current to the conductor of the cable; wherein each repeater is connected in series to the conductor and develops the necessary biasing voltages through power separation filters and zener power diodes. This is accomplished by impressing a high DC voltage on the conductor at one shore station and a negative DC voltage on the conductor at another station.

FIG. 1A is a diagram showing an example of a power feed system for three-path power feed. A branching point is installed between three terminal stations A, B, and C, to carry out a power source feed for each repeater. Each power feed line is connected to the ground at a branching point to carry out a power feed at each terminal station.

The potential level between terminal stations A and B in FIG. 1A is denoted in the lower part of FIG. 1A.

Based upon the constitution of FIG. 1A, when the distance between a terminal station A and a branching point is longer or shorter than that between another terminal station and the branching point, feeding power between each terminal station becomes in an unbalanced state. For preventing unbalance therebetween, another power feed system of FIG. 1B is devised which can utilize both-end power feed and single-end power feed.

In FIG. 1B, a branching point can be selectively connected to ground from either a terminal station B or C and both-end power feed is carried out between the terminal A and the terminal B where the terminal station C is connected to ground.

The potential level in such a case is denoted in the lower part of FIG. 1B.

This power feed system also can implement a both-end power feed between the terminal stations A and C and a single-end power feed at the terminal station B. The merit of the system is that, even if the distance between at least two points, i.e., a terminal station and a branching point is not equal or is unbalanced, when one terminal station A is connected to a positive power source and the other terminal stations B and C are connected to a negative power source, the power feed between each station can be equal or averaged in the case of power feed between A and B, or between A and C.

The present invention intends to utilize the system constitution of FIG. 1B.

In general, an optical submarine repeater is provided at every several tens of kilometers in a long distance optical transmission line system such as an optical submarine cable transmission line system, and electric power is supplied to an optical submarine repeater which is connected in series from the power unit or the power feed equipment in a constant current power mode. Two kinds of power systems exist. These include a single-end power system fed from only one terminal station of a power unit and a both-end power system fed from a two terminal stations of a power unit. A both-end power system is generally adopted for a long distance transmission line.

In an optical submarine cable transmission line system, an optical transmission line is branched by a branch circuit, and it is possible to provide a system which carries out an optical transmission between three terminal stations. The power feed in this transmission line system carries out a both-end power feed between two terminal stations and a single end power feed by the residual third terminal station. Since a branch unit is laid at the bottom of the sea, the switching between a both-end power feed and a single-end power feed is carried out by a vacuum relay or the like, which is operated by power feed current. Therefore, a demand has arisen for such a power path switching circuit for switching between a both-end power feed and a single end power feed without producing a switching under a high voltage impression condition, because of possible failure in a transmission line and a power feed line.

FIG. 2 is a schematic diagram of a branching point unit with an optical fiber circuit and a power feeding switching circuit according to an embodiment of the present invention.

A signal line and a power feed line for data transmission between optical fiber cables are connected to an optical fiber circuit and a power feed switching circuit, respectively.

FIG. 3 is another constitution of the branching point unit. In FIG. 3, a plurality of signal lines for data transmission is installed and a switching operation for connection can be carried out by the optical fiber switching circuit.

The present invention pertains to the power feed switching circuit of the branching point unit shown in FIG. 2 and FIG. 3.

FIGS. 1A and 1B show only a power feed path and the data transmission line is omitted.

As is obvious in an optical submarine cable transmission line system, since the above-described power path switching circuit is laid at the bottom of the sea, a high reliability is necessary to ensure a continuous operation. Once a contact failure occurs in the power path switching circuit, it is disadvantageous to form a desired power path when a power feed is built-up for a system initialization thereafter.

SUMMARY OF THE INVENTION

Therefore, it is an object of the present invention to maintain a stable switching state of the power path when a failure occurs in the power path, and to prevent a switching in a high voltage impression condition.

In accordance with the present invention, there is provided a power feed system in a transmission line between terminals of a three-terminal station, which is branched by a branching unit and is power fed between the terminals of the three-terminal station, the power feed system including: switching means for switching a power on a power feed line to a repeater between a both-end power feed mode and a single-end power feed mode; and connection holding means for holding a power feed connection state without change upon an occurrence of a failure.

In accordance with another feature of the present invention, there is provided a power feed system as follows. In a power feed system for switching by a selective connection of a both-end power feed between a first power unit and either a second or a third power unit, and a single-end power feed mode by either one of the second or first power units, the system branching a transmission line by a branching unit and the power units being located at each three-terminal station of the transmission system for transmitting between three-terminal stations, the power feed system in the transmission line between three-terminal stations includes: switching means operating at the both-end power feed between the first power unit and either one of the second or third power units and for switching the second or third power unit for the single-end power feed from the first power unit to ground; self-holding means operating at the single-end power feed of the second or third power unit and holding the selected connection by the switching means; and releasing means for releasing the third or second power unit for the single-end power feed and the first power unit.

In accordance with still another feature of the present invention, there is provided a power feed system as follows. In a power feed system for switching by a selective connection of a both-end power feed between a first power unit and either a second or a third power unit, and a single-end power feed by the other of the second or third power units, the power feed system for switching by the selective connection includes: a first relay and a second relay operating at the both-end power feed and provided with contacts which implement a switching operation of the second or third power unit for the single-end power feed from the first power unit to the ground; and a third relay and a fourth relay operating at the single-end power feed and provided with a contact for self-holding and contacts for releasing either one of the power units at the single-end power feed and the first power unit.

BRIEF DESCRIPTION OF THE DRAWINGS

FIG. 1B a schematic diagram of a branching unit and a potential distribution according to an embodiment of the present invention;

FIG. 4 is a schematic diagram of three states of the prior art switching circuits, i.e., (1) initial state, (2) normal operating state, and (3) failure state;

FIG. 6 is a circuit diagram showing an initial state of the circuit of FIG. 5;

FIG. 7 is a circuit diagram showing a normal operating state of the circuit of FIG. 5;

FIG. 8 is a circuit diagram showing a failure state of the circuit of FIG. 5;

FIG. 9 is a circuit diagram showing a recovered state of the circuit of FIG. 8;

FIGS. 11, 11a and 11b are flow charts of the formation of the power feed line between a main-terminal station and two sub-terminal stations.

DESCRIPTION OF THE PREFERRED EMBODIMENTS

Figure 1A:
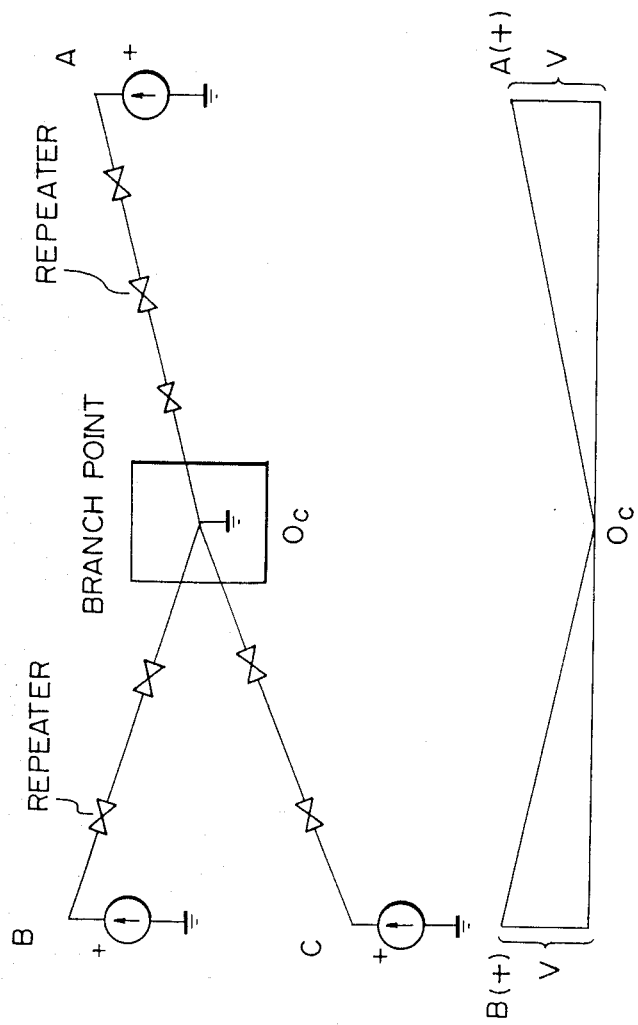
FIG. 1A is a schematic diagram of a prior art branching unit and a potential distribution.
Figure 2:
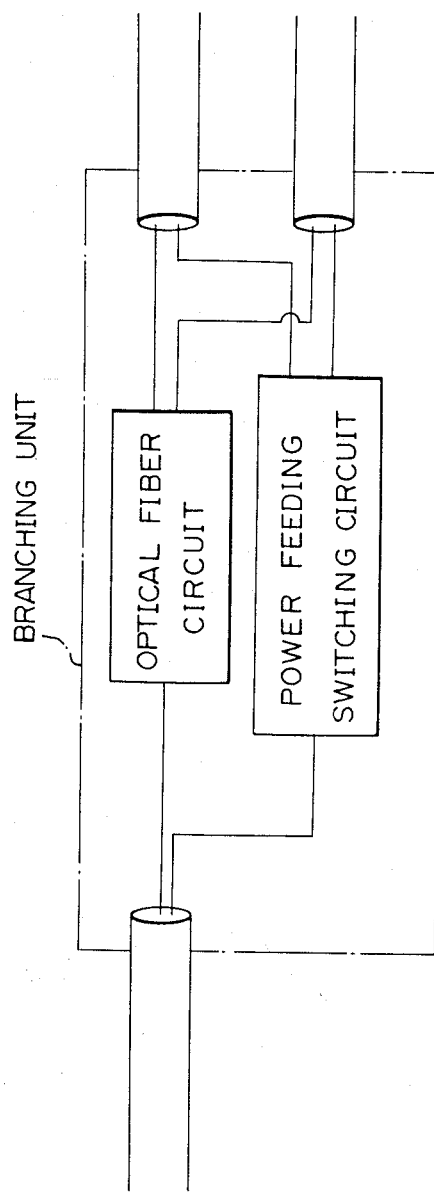
FIG. 2 is a schematic diagram of a branching unit circuit having an optical fiber circuit and a power feed switching circuit according to the present invention.
Figure 3:
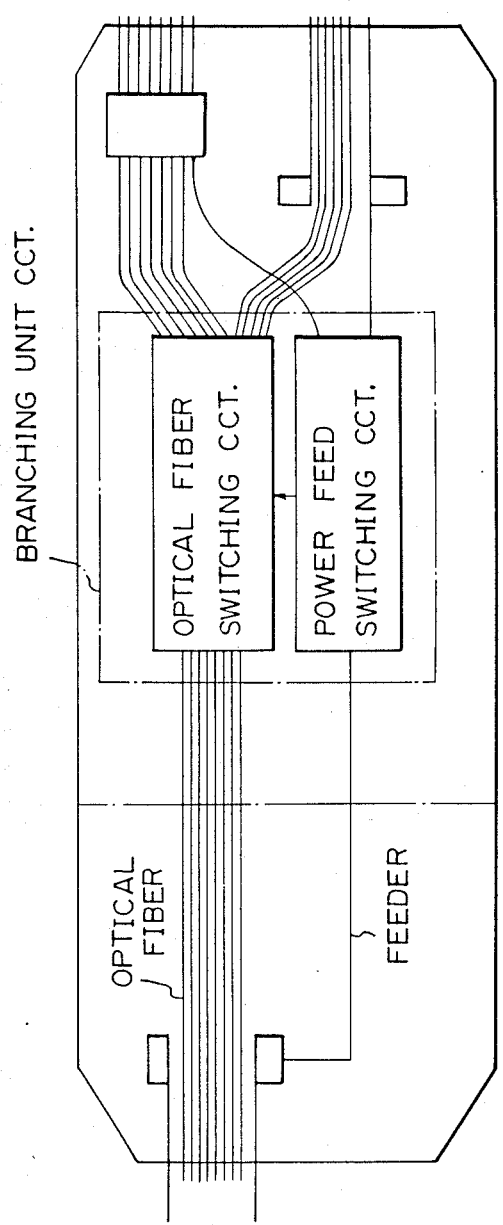
FIG. 3 is a schematic diagram of another branching unit having an optical fiber switching circuit and a power feed switching circuit according to an embodiment of the present invention.

Before describing the preferred embodiments of the invention, the prior art power path switching circuit will be described with reference to FIG. 4. In FIG. 4, terminals A, B and C are connected to a terminal station via a power feed unit of the terminal station and a repeater, and a terminal E is connected to the ground. $K_1$ and $K_2$ are high voltage relays such as a vacuum relay, and $k_1$ and $k_2$ denote the contacts of the relays.

For example, in an initial state (1) of FIG. 4, suppose that the terminal A side has a positive polarity and the terminal B side has a negative polarity. When a power feed voltage is raised, current flows in the relay $K_1$ in proportion to the power feed voltage. When the current surpasses the pull-in current of the relay $K_1$, the contact $k_1$ is switched over to a state $K_{01}$ and a normal operating state (2) is reached, as shown in FIG. 4(2). Accordingly, a both-end power feed mode is realized in which the power is fed from the terminal A side and the terminal B side. When the feed voltage of the terminal C side is raised, the feed current flows through the terminal E to the ground side and a single-end power feed mode is realized.

Further, in an initial state (1) shown in FIG. 4, suppose that the terminal A side has a positive polarity and the terminal C side has a negative polarity. When a power feed voltage is raised, the contact $k_2$ of the relay $K_2$ is switched over and the terminal B is connected with the terminal E. As a result, a both-end power feed mode in which power is fed from the terminal A side and the terminal C side and a single-end power feed mode in which power is fed from the terminal B side to the ground side are realized.

In a normal operating state (2) shown in FIG. 4, if a failure occurs on the terminal A side or the terminal B side, and the flow of the power feed current is interrupted, the contact $k_1$ of the relay $K_1$ is moved back from the state $k_{01}$ to the state $k_{02}$.

As described with reference to the normal operating state (2) shown in FIG. 4, when the both-end power feed mode fed from the terminal A side and the terminal B side and the single-end power feed mode exist simultaneously, the potentials in the vicinity of the terminals C and E and the contact $k_1$ are nearly 0 volts, whereas the potentials of the terminals A and B and in the vicinity of the relay $K_2$ are other than 0 volts.

When the power feed current does not flow because of a failure in the terminal A side or in the terminal B side, the contact $k_1$ of the relay $K_1$ is moved back from the state $k_{01}$ to the state $k_{02}$. In this case, a high voltage is applied to the relay $K_2$ and the power feed current from the terminal C is interrupted, and therefore, an arc discharge at the contact $k_1$ occurs and, a contact fault may be exist. Once a contact fault occurs in an optical submarine cable transmission system, when the following power feed is built up, a drawback arises in that the formation of a desired power path can not be realized. Accordingly, desirably, even if a fault occurs in the power feed path, switching will not occur in a high voltage impression condition.

Therefore, the present invention has been devised to overcome the above-described disadvantage. Namely, in the present invention, a switching state is maintained as it is, by a device having a simplified constitution, even if a failure occurs in the power feed path.

An embodiment of the present invention will be described in detail with reference to the drawings.

Figure 5:
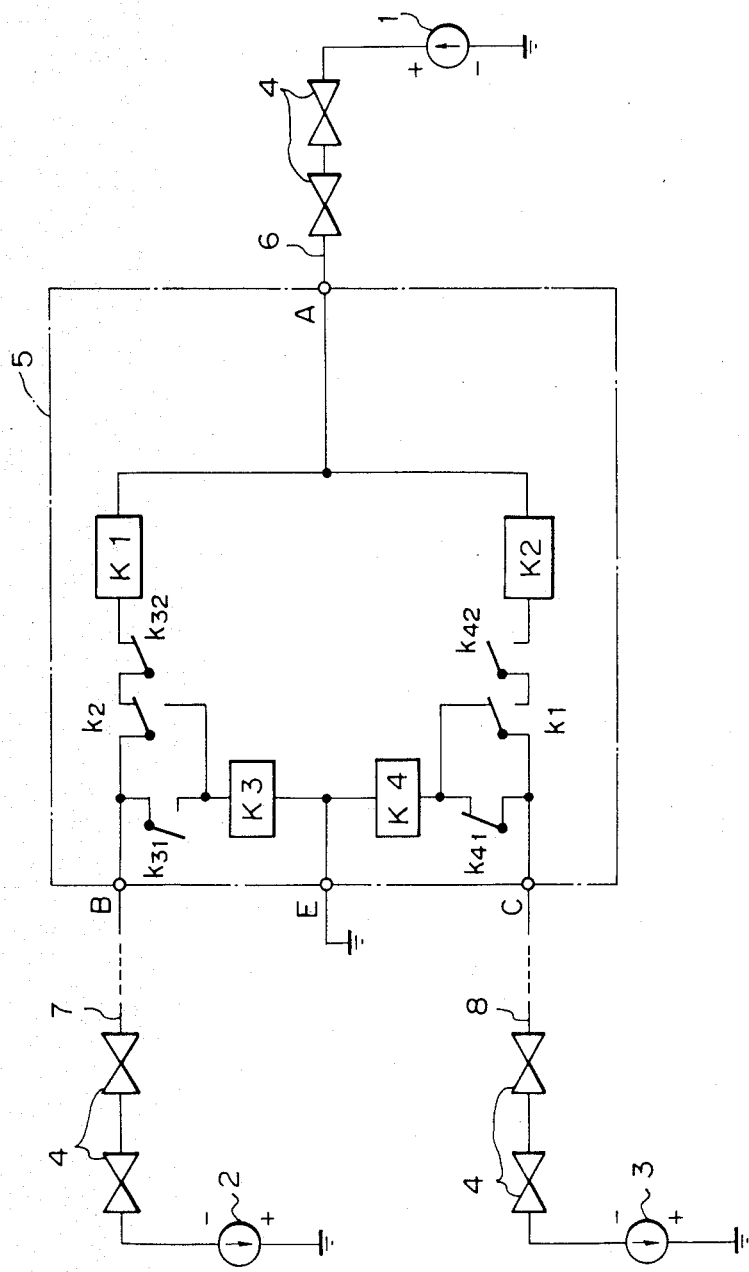
FIG. 5 is a schematic connection diagram of a power feed switching circuit according to an embodiment of the present invention.

FIG. 5 is a circuit diagram of an embodiment according to the present invention. In FIG. 5, reference numerals 1, 2 and 3 denote first, second and third power feed units, 4 denotes repeaters, 5 a power feed path switching circuit, and 6, 7, 8 are power feed lines. A, B, C and E are terminals of the power feed switching circuit 5, $K_1$ to $K_4$ are first, second, third and fourth relays, such as a vacuum relay, and $k_1$, $k_2$, $k_{31}$, $k_{32}$, $k_{41}$, $k_{42}$ are contacts of these relays.

A power feed line 6 in the first power unit 1 side is connected to a terminal A, a power feed line 7 in the second power unit 2 is connected to a terminal B, a power feed line 8 in the third power unit 3 is connected to a terminal C and a terminal E is connected to the ground.

The power feed polarities of the above first, second and third power units 1 to 3 are set as shown in FIG. 5. When the relay $K_1$ operates, a power feed voltage having a positive polarity is applied to the terminal A of the power feed line switching circuit 5 via the power feed line 6 from the first power unit 1, and a power voltage having a negative polarity is applied to the terminal B of the power feed line switching circuit 5 via the power feed line 7 from the second power unit 2 and power is fed to a repeater 4 connected to the power feed lines 6, 7 by a both-end power feed. A power feed voltage having a negative polarity is applied to the terminal C of the power feed line switching circuit 5 via the power feed line 8 from the third power unit 3. In this case, the power feed current from the third power unit 3 flows via the contacts $k_{41}$ and $k_1$, the relay $K_4$, and the terminal E, and the power is fed to the repeater connected to the power feed line 8 by a single-end power feed.

FIG. 6 is a circuit diagram of an initial state in an embodiment of the present invention.

When a voltage is not applied to the terminals A, B and C, current does not flow in the relays $K_1$ to $K_4$, and thus the contacts $k_1$, $k_2$, $k_{31}$, $k_{32}$, $k_{41}$ and $k_{42}$ are in the state shown in FIG. 6.

FIG. 7 is a circuit diagram of a normal operating state in an embodiment of the present invention. When the power feed voltage in the terminal A and in the terminal B is raised, current flows in the relay $K_1$ in the direction shown by an arrow. When the current surpasses the pull-in current of the relay $K_1$, the contact $k_1$ of the relay $K_1$ is switched from the relay $K_2$ to the relay $K_4$ (viz., from a position $k_{11}$ to a position $k_{12}$). Next, a negative power feed voltage is applied from the terminal C, and current flows through the relay $K_4$ via the contact $k_1$. When the current surpasses the pull-in current of the relay $K_4$, the contact $k_{41}$ is closed and current flows through the relay $K_4$ in the direction shown by an arrow and reaches a self-holding state. At this stage the contact $k_{42}$ is open, i.e., the same switching state as shown in FIG. 5 is realized.

FIG. 8 is a circuit diagram of a failure state in an embodiment of the present invention.

When a failure occurs in the power feed line in the terminal A or in the terminal B and current fails to flow through the relay $K_1$, the contact $k_1$ is switched from the relay $K_4$ to the relay $K_2$ as shown in the figure. Since the relay $K_4$ is placed in a self-holding state by the contact $k_{41}$, the contact $k_{42}$ remains open and thus a high voltage can not be applied to the contact $k_1$ via the relay $K_2$, preventing the possibility of an arc discharge.

When a failure occurs in the power feed line of the terminal C and no current flows through the relay $K_4$, the contact $k_{41}$ is opened and the contact $k_{42}$ is closed. In this case, the contact $k_{41}$ is short-circuited by the contact $k_1$ of the relay $K_1$, and thus the operation of the contact $k_{41}$ cannot cause an arc discharge. If the contact $k_{42}$ is closed and the relay $K_1$ operated, the circuit is separated by the contact $k_1$, as shown in FIG. 9. Therefore, when the potential in the vicinity of the relay $K_2$ is high, an arc discharge cannot occur. Therefore, because a failure in the power feed line does not change the switching state, a high voltage switching does not occur and thus the problem of a contact failure does not arise.

Figure 10:
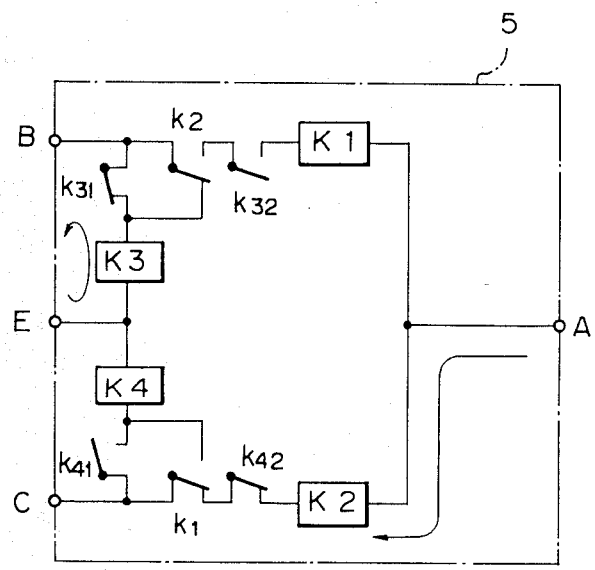
FIG. 10 is a circuit diagram of another type of operating state in an embodiment of the present invention.

FIG. 10 is a circuit diagram of another type of operating state in an embodiment of the present invention. When the power feed voltage in the terminal A and in the terminal C is raised, current flows through the relay $K_2$ in the direction of the arrow shown in the lower part of FIG. 10. When the current surpasses the pull-in current of the relay $K_2$, the contact $k_2$ of the relay $K_2$ is switched from the relay $K_1$ to the relay $K_3$, a negative power feed is carried out from the terminal B, and current flows through the relay $K_3$ via the a contact $k_2$. When the current surpasses the pull-in current of the relay $K_3$, the contact $k_{31}$ is closed and the contact $k_{32}$ is opened. As a result, the both-end power feed by the terminal A and the terminal C and the single-end power feed by the terminal B is realized.

In the power feed state shown in FIG. 10, even if a failure occurs in the power feed line, the power feed switching state is maintained, and because the switching circuit does not implement a high potential switching, the operation of contacts is kept failure-free.

Figure 11B:
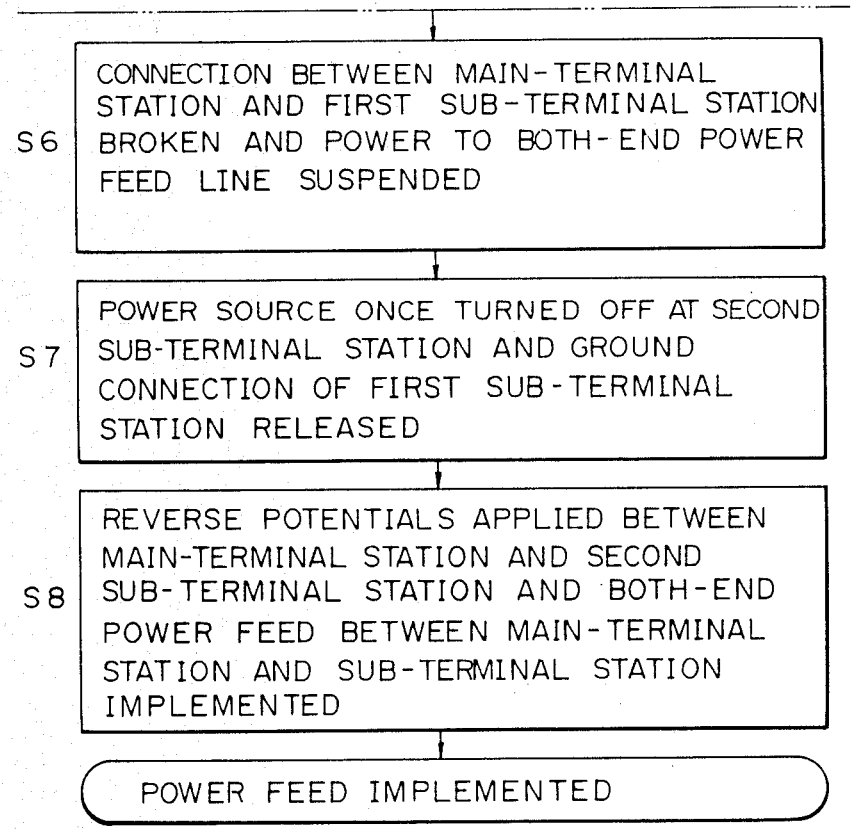

FIG. 11 is a flow chart of the realization of a power feed line between a main-terminal station and two sub-terminal stations.

First, the system operation is started, and then, at step $S_1$, one sub-terminal station is selected to carry out a both-end power feed.

At step $S_2$, reverse potentials, i.e., a positive and a negative potential, are applied between a main-terminal station and a first sub-terminal station to implement a both-end power feed between the main-terminal station and the first sub-terminal station.

At step $S_3$, after the continuity of the power feed between the main-terminal station and a first sub-terminal station is established, a second sub-terminal station side is connected to and held at ground.

At step $S_4$, a both-end power feed and a single-end power feed are implemented.

At step $S_5$, a failure occurs during the both-end power feed.

Then, at step $S_6$, the connection between the main-terminal station and the first sub-terminal station is interrupted, and the power supply to the both-end power feed line is suspended, but the single-end power feed from the second sub-terminal station is maintained.

At step $S_7$, the power source is once turned OFF at the second sub-terminal station, and the ground connection of the first sub-terminal station is released.

At step $S_8$, the reverse potentials are applied between the main-terminal station and the second sub-terminal station and the both-end power feed is implemented between the main-terminal station and the second sub-terminal station.

The above steps can be routinely used in the formation of a power feed line between the main-terminal station and two sub-terminal stations.

We claim:

1. A power feed system in a transmission line between terminals of a three-terminal station which is branched by a branching unit and has power fed between said terminals of said three-terminal station, said power feed system comprising:
   switching means for switching power on a power feed line to a repeater between a both-end power feed mode and a single-end power feed mode; and
   connection holding means for holding a power feed connection state without change upon an occurrence of a failure.

2. A power feed system according to claim 1, wherein said three-terminal station is constituted by a main-terminal station and two substations, a both-end power feed is carried out between said main station and a first of said two substations and a second of said two substations carries out a single-end power feed, said switching means comprising a first connecting means for connecting a both-end power feed path between said main station and said first substation and a second connecting means for connecting an earth potential source with said second substation.

3. A power feed system according to claim 2, wherein when a power feed between said main-terminal station and said first sub-station is interrupted, the supply of an earth potential to said second sub-station is maintained by said connection holding means.

4. A power feed system according to claim 3, wherein when a power feed between said second sub-station and the earth potential source is also interrupted, said connection holding means is released.

5. A power feed system according to claim 4, wherein when a power feed between said main-terminal station and said second sub-station is carried out, a connection between said main-terminal station and said second sub-station is maintained and said first sub-station is connected to the earth potential source.

6. A power feed system for switching by a selective connection of a both-end power feed mode between a first power unit and a second or third power unit, and a single-end power feed mode by one of said power units, said system branching a transmission line at a three-terminal station into two transmission lines by a branching unit and said power units being equipped for transmitting power and provided on the transmission lines between said three-terminal stations, said power feed system compressing:
   switching means operating at said both-end power feed mode between said first power unit and one of said second or third power units and switching said second or third power unit to a single-end power feed mode by switching from said first power unit to ground;
   self-holding means operating at said single-end power feed mode of said third or second power unit and holding said single-end power feed mode by said switching means; and
   releasing means releasing said second or third power unit, for the single-end power feed mode, and said first power unit.

7. A power feed system according to claim 6, wherein said switching means comprises a first relay and a second relay having contacts for switching said second or third power unit from said first power unit to ground;
   said self-holding means and said releasing means including a third relay and a fourth relay, each of which operates in a single-end power feed mode and is provided with a self-holding contact and a releasing contact for releasing said third or second power unit, for a single-end power feed mode, and said first power unit.

8. A power feed system for switching by a selective connection of a both-end power feed between a first power unit and a second or a third power unit, and a single-end power feed by one of said power units, said power feed system for switching by a selective connection comprises:
   a first relay and a second relay operating at a both-end power feed mode and provided with contacts which implement a switching operation of said second or third power unit for a single-end power feed mode, from said first power unit to ground; and
   a third relay and a fourth relay operating at said single-end power feed mode and provided with a contact for self-holding and contacts for releasing one of said power units at the single-end power feed mode and said first power unit.

9. A power feed system for a transmission line branching circuit for feeding power to repeaters, comprising:

a first transmission line to be branched having a first power unit and first repeaters between the first power unit and the transmission line branching circuit;

second and third transmission lines branched from said first transmission line at the branching circuit, having second and third power units and second repeaters and third repeaters between the second power unit and the third power unit and the transmission line branching circuit, respectively;

switching means for switching said first transmission line and one of said second and third transmission lines to a both-end power feed mode to supply power to the first repeaters and one set of said second and third repeaters, and switching the other of said second and third transmission lines to a single-end power feed mode to supply power to the second repeaters or the third repeaters; and connection holding means for holding the power feed modes on occurrence of a failure.

10. A power feed system for a transmission line branching circuit according to claim 9, wherein the one of said second and third transmission lines in the single-end power feed mode is connected to ground at the transmission line branching circuit.

11. A power feed system for a transmission line branching circuit according to claim 10, wherein when the both-end power feed mode is interrupted the connection of the single-end power feed mode to the ground is maintained by said connection holding means.

12. A power feed system for a transmission line branching circuit according to claim 11, wherein when the single-end power feed mode is also interrupted, said connection holding means releases the power feed modes.

* * * * *

UNITED STATES PATENT AND TRADEMARK OFFICE
CERTIFICATE OF CORRECTION

PATENT NO. : 4,798,969
DATED : January 17, 1989
INVENTOR(S) : Yoshiyuki Inoue et al.

It is certified that error appears in the above-identified patent and that said Letters Patent is hereby corrected as shown below:

Front Page, [56], Col. 6, after line 14, insert
--OTHER PUBLICATIONS
M. W. Perry et al., "Physical Design of the SL Branching Repeater", IEEE Journal on Selected Areas in Communications, Nov. 1984, Vol. SAC-2, No. 6, pp 929--.

Col. 6, line 66, "K3" should be $--K_3--$;
line 66, delete "a".

Col. 8, line 21, "unit" should be --unit,--;
line 24, "compressing" should be
--comprising--.

Signed and Sealed this

Twenty-first Day of May, 1991

Attest:

HARRY F. MANBECK, JR.

*Attesting Officer*                *Commissioner of Patents and Trademarks*